(12) United States Patent
Kang (10) Patent No.: US 12,527,113 B2
(45) Date of Patent: Jan. 13, 2026

(54) LIGHT CONCENTRATING METHOD, LIGHT CONCENTRATING DEVICE USING SAME, AND SOLAR POWER GENERATOR

(71) Applicant: Linfinity Inc., Seoul (KR)

(72) Inventor: Young-Ju Kang, Seoul (KR)

(73) Assignee: Linfinity Inc., Seoul (KR)

( * ) Notice: Subject to any disclaimer, the term of this patent is extended or adjusted under 35 U.S.C. 154(b) by 5 days.

(21) Appl. No.: 18/296,484

(22) Filed: Apr. 6, 2023

(65) Prior Publication Data

US 2023/0324659 A1    Oct. 12, 2023

(30) Foreign Application Priority Data

Apr. 7, 2022    (KR) .................. 10-2022-0043622

(51) Int. Cl.
*H10F 77/42*        (2025.01)
*H02S 40/22*        (2014.01)
*H10F 77/40*        (2025.01)
*G02B 19/00*        (2006.01)

(52) U.S. Cl.
CPC .......... *H10F 77/488* (2025.01); *H02S 40/22* (2014.12); *H10F 77/407* (2025.01); *G02B 19/0023* (2013.01); *G02B 19/0042* (2013.01)

(58) Field of Classification Search
CPC ... H01L 31/0547; H02S 40/22; H10F 77/407; H10F 77/488
See application file for complete search history.

(56) References Cited

U.S. PATENT DOCUMENTS

2007/0181173 A1 * 8/2007 Neubauer ........... H01L 31/0547
                                                            136/246
2011/0259318 A1 * 10/2011 Kinley ................... F24S 23/77
                                                            126/696

FOREIGN PATENT DOCUMENTS

KR         101571926 B1    12/2015

* cited by examiner

*Primary Examiner* — Lindsey A Buck
(74) *Attorney, Agent, or Firm* — NKL Law; Jae Youn Kim (57) ABSTRACT

Disclosed herein is a light concentrating device which is arranged in a space defined by three axes orthogonal to each other and has a first specular surface and a second specular surface. The first specular surface concentrates incident lights in any one two-dimensional direction and reflects the incident lights as first reflected lights, and the second specular surface concentrates the first reflected lights in the other two-dimensional direction and reflects the first reflected lights as second reflected lights to reach a target area. Accordingly, the first specular surface and the second specular surface are easy to manufacture. The first specular surface, the second specular surface, and the target area are arranged not to block the first reflected lights and the second reflected lights, so there is no light loss. The first specular surface, the second specular surface, and the target area occupy small areas with respect to a plane perpendicular to the incident lights. Therefore, the present invention can enhance the degree of arrangement integration of the light concentrating devices.

12 Claims, 9 Drawing Sheets

LIGHT CONCENTRATING METHOD, LIGHT CONCENTRATING DEVICE USING SAME, AND SOLAR POWER GENERATOR

BACKGROUND OF THE INVENTION

Field of the Invention

The present invention relates to a light concentrating method capable of enhancing light concentrating efficiency having a simple shape to be easily manufactured, a light concentrating device using the same, and a solar power generator to which the light concentrating device is applied.

Background Art

Solar panels are being installed on the surface of the earth for solar power generation. The area where the solar panels are installed is proportional to the solar power generation quantity. Thus, in order to increase the power generation quantity, a solar panel capable of covering a large area are installed.

The light density of the sun radiated by the earth's surface falls short of the rated operating range of the solar panel currently being produced. Therefore, the solar panel covers the whole wide area to generate solar power, but the solar panel is high-priced and efficiency is reduced.

Accordingly, a method of concentrating sunlight and installing a solar panel capable of covering the size of the area for the concentrated light is being sought. As well known, the light concentrating method includes a method using a lens and a method using a specular surface. However, a large-area lens is more expensive and heavier. In this regard, the method using the specular surface is more advantageous in terms of price.

The surface profile that focuses parallel light on a specific focal point is a parabolic plane. However, the cost to manufacture a mirror of a three-dimensional surface having the parabolic plane is very high.

On the other hand, in a case in which a mirror of a two-dimensional surface is installed to face the incident direction of sunlight, the focal point to concentrate light by the parabolic mirror is arranged in the solar incident path toward the specular surface. Therefore, in a case in which the solar panel is directly placed at the light-concentrating focal position, the solar panel blocks the sunlight incident path. In order to avoid this phenomenon, even if the solar panel is installed outside the sunlight irradiation path and an additional specular surface for reflecting the reflected light, which has been concentrated at the light-concentrating focal position, to the solar panel is placed at the light-concentrating focal position, the phenomenon of blocking the light incident path is unavoidable.

SUMMARY OF THE INVENTION

Accordingly, the present invention has been made to solve the above-mentioned problems occurring in the prior arts, and it is an object of the present invention to provide a light concentrating method using a mirror, specifically, to provide a light concentrating method which is simple and low-priced to manufacture a specular surface for two-dimensional light concentration, and a light concentrating device using the same.

It is another object of the present invention to provide a light concentrating method in which a specular surface never blocks a light moving path from incident light to a light-concentrating target area and an area of the specular surface is minimized, and a light concentrating device using the same.

It is another object of the present invention to provide a solar power generating method using the light concentrating method, and a solar power generator using the light concentrating device.

The technical objects of the present invention are not limited to the above-mentioned objects, and other objects and advantages of the present invention not mentioned above can be understood by the following description, and more clearly understood by embodiments of the present invention. Furthermore, the objects and advantages of the present invention may be realized by means and combinations thereof described in the claims.

To accomplish the above object, according to the present invention, there is provided a light concentrating device, which is arranged in a space defined by a first axis and a second axis orthogonal to each other, and a third axis perpendicular to the first axis and the second axis. The light concentrating device selectively includes the following technical characteristics.

The light concentrating device includes a first specular surface and a second specular surface.

The first specular surface has a first profile of a concave curve, which is the cross section taken by a plane parallel to the second axis and the third axis, wherein the first profile extends in a direction of the first axis.

The first specular surface extends in the direction of the first axis while maintaining the shape of the first profile. Accordingly, in order to configure the first specular surface, a reflective film in the form of a flat sheet is attached onto the surface having the shape of the first profile along the curved surface.

The second specular surface has a second profile of a concave curve, which is the cross section taken by a plane parallel to the first axis and the second axis, wherein the second profile extends in a direction of the third axis.

The second specular surface extends in the direction of the third axis while maintaining the shape of the second profile. Accordingly, in order to configure the second specular surface, a reflective film in the form of a flat sheet is attached onto the surface having the shape of the second profile along the curved surface.

The first specular surface has a predetermined length in a direction of the second axis and a predetermined width in the direction of the first axis when viewed in a direction parallel to the third axis.

Accordingly, incident lights entering the first specular surface in the direction parallel to one direction of the third axis have the above-mentioned length in the direction of the second axis and the above-mentioned width in the direction of the first axis.

The first specular surface reflects the incident lights in an oblique direction to face the other direction of the third axis and one direction of the second axis so as to generate first reflected lights.

The first specular surface has a curved surface that the shape of the first profile extends in the direction of the first axis.

The first specular surface concentrates the incident lights in such a way that the length is reduced so as to generate first reflected lights.

The first specular surface concentrates the incident light in such a way that the width is constant so as to generate first reflected lights.

The second specular surface reflects the first reflected lights to face the other direction of the second axis so as to generate second reflected lights.

In this instance, the second specular surface obliquely reflects the first reflected lights to face the other direction of the second axis and the other direction of the third axis so as to generate second reflected lights.

In this instance, the second specular surface concentrates the first reflected lights in such a way that the width is reduced so as to generate second reflected lights.

In this instance, the second specular surface may do not further concentrate the first reflected lights, which concentrated in such a way that the length is reduced, in such a way that the length is reduced further. That is, the second specular surface may maintain the light concentration rate to reduce the length of the first reflected lights as it is.

Accordingly, the second reflected lights are concentrated into a target area in which the width and the length of the incident lights are reduced.

The target area is arranged at a position getting out of an area through which the incident lights pass.

The second specular surface is arranged at the position getting out of an area through which the incident lights pass.

The first specular surface is arranged at a position getting out of an area through which the second reflected lights pass.

The shape of the first profile of the first specular surface may extend parallel to the first axis in a direction perpendicular to the second axis and the third axis.

The shape of the second profile of the second specular surface may extend parallel to the third axis in a direction perpendicular to the first axis and the second axis.

The shape of the second profile of the second specular surface may extend obliquely with respect to the second axis and the third axis in the direction perpendicular to the first axis.

The first profile and the second profile may be formed in a parabolic shape.

A first specular focal point may be defined by the shape of the first profile.

The first specular focal point may be arranged in the other direction of the third axis from a position getting out of a section that the first specular surface occupies in the direction of the third axis.

The first specular focal point may be arranged at the other end of the section that the first specular surface occupies in the direction of the third axis.

The first specular focal point may be arranged in one direction of the second axis from a position getting out of a section that the first specular surface occupies in the direction of the second axis.

The first specular focal point may be arranged in the other direction of the third axis from a position getting out of a section that the second specular surface occupies in the direction of the third axis.

The first specular focal point may be arranged at the other end of the section that the second specular surface occupies in the direction of the third axis.

The first specular focal point may be arranged in one direction of the second axis from a position getting out of a section that the second specular surface occupies in the direction of the second axis.

A second specular focal point may be defined by the shape of the second profile.

The second specular focal point may be arranged in the other direction of the second axis in a section that the second specular surface occupies in the direction of the first axis.

The first specular focal point may move to a first edge specular focal point by reflecting some of the first reflected lights by edge portions of both ends of the second specular surface in the direction of the first axis.

The first specular focal point may move to a first central specular focal point by reflecting the rest of the first reflected lights by the central portion of the second specular surface in the direction of the first axis.

The first edge specular focal point may be arranged at a position coinciding with the first central specular focal point in the direction of the second axis, or arranged at the other side further in the direction of the second axis than the first central specular focal point.

The first edge specular focal point may be arranged at a position coinciding with the first central specular focal point in the direction of the third axis, or arranged at one side further in the direction of the third axis than the first central specular focal point.

The second specular focal point defined by the shape of the second profile may be arranged at a position coinciding with the first edge specular focal point in the direction of the second axis or arranged at one side further in the direction of the second axis than the first edge specular focal point, and is arranged at a position coinciding with the first central specular focal point in the direction of the second axis or is arranged at the other side further in the direction of the second axis than the first central specular focal point.

According to the present invention, a solar power generator may be configured in such a way that a solar panel is arranged in a target area of the light concentrating device.

The first specular surface, the second specular surface, and the solar panel may be integrally adjusted in their directions so that the third axis defined by the first specular surface, the second specular surface, and the solar panel is parallel to the incident direction of sunlight.

According to the present invention, a steam generator may be configured in such a way that a heat absorber is arranged in the target area of the light concentrating device. That is, the light concentrating device may be used as a heat collector.

The first specular surface, the second specular surface, and the heat absorber may be integrally adjusted in their directions so that the third axis defined by the first specular surface, the second specular surface, and the heat absorber is parallel to the incident direction of sunlight.

According to the present invention, a natural lighting device may be configured in such a way that an optical tunnel or an optical fiber is arranged in the target area of the light concentrating device.

The first specular surface, the second specular surface, and a light inlet of the optical tunnel or the optical fiber may be integrally adjusted in their directions so that the third axis defined by the first specular surface, the second specular surface, and the optical tunnel or the optical fiber is parallel to the incident direction of sunlight.

According to the present invention, the light concentrating method using a mirror is easy and low-priced to manufacture the specular surface for two-dimensional light concentration with the reflective film of a flat sheet type.

According to the present invention, the first specular surface, the second specular surface, and the target area do not block incident light and the irradiation path for two-dimensionally concentrating the incident light to the focal point. Therefore, there is no light loss occurring due to the arrangement of the mirror.

The present invention may minimize the space occupied by the first specular surface and the second specular surface in the directions of the first axis and the second axis, and maximize the area of incident light entering in the direction of the third axis. Therefore, the light concentrating devices can be installed in a small area with in a very high degree of integration.

In addition to the above effects, specific effects of the present invention will be described together with specific details for carrying out the present invention.

DETAILED DESCRIPTION OF THE PREFERRED EMBODIMENT

Hereinafter, preferred embodiments of the present invention will be described in detail with reference to the accompanying drawings.

The present invention is not limited to the embodiments disclosed below, and various changes may be made and realized in various different forms. The embodiments of the present invention are provided to make the disclosure of the present invention complete and to completely notify those skilled in the art of the scope of the invention. Therefore, the present invention is not limited to the embodiments disclosed below, but it should be understood that any one of the embodiments may be substituted with another one or an additional embodiment may be added to the present invention, and the invention includes all modifications, equivalents, and replacements belonging to the concept and the technical scope of the invention.

The accompanying drawings are only for easy understanding of the embodiments disclosed in this specification, and it should be understood that the technical idea disclosed in this specification is not limited by the accompanying drawings, and the present invention includes all modifications, equivalents, and replacements belonging to the idea and the technical scope of the invention. In the drawings, thicknesses or sizes of components may be exaggerated to be larger or smaller for convenience in understanding, but the protection scope of the present invention should not be construed as being limited by the above.

The terms used in the following description are intended to merely describe specific embodiments, but not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

It will be understood that terms, such as "first" or "second" may be used in the specification to describe various components but are not restricted to the above terms. The terms may be used to discriminate one component from another component.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, referring to FIGS. 1 to 6, a light concentrating device according to a first preferred embodiment of the present invention, a light concentrating method and a solar power generator using the same will be described.

The concentrating device is arranged in a space defined by a first axis X, a second axis Y and a third axis Z orthogonal to each other. The first axis X to the third axis Z are to be understood as axes interlocking with the posture of the light concentrating device, which will be described later, rather than being fixed axes in the space.

The light concentrating device includes a first specular surface 21 for reflecting incident lights L1, L2, L3, and L4 as first reflected lights L11, L22, L33, and L44, and a second specular surface 31 for reflecting the first reflected lights L11, L22, L33, and L44 as second reflected lights L111, L222, L333, and L444.

The first specular surface 21 has a first profile of a concave curve, which is the cross section taken by a plane parallel to the second axis Y and the third axis Z. The concave curve may be a parabola. For the purposes of the present invention, it may be understood that the parabola means the degree of concentrating and reflecting parallel light coming in one direction in the vicinity of the focal point of the parabola, rather than a precise parabola.

The shape of the first profile defines a first specular focal point F1.

Of course, the first profile is not necessarily limited to the parabolic shape. In the present invention, the first profile may have other shapes such as an elliptical arc, a circular arc, a hyperbolic arc, and the like.

The first specular surface 21 has a curved surface that the shape of the first profile extends in the direction of the first axis X.

The shape of the first profile of the first specular surface 21 extends parallel to the first axis X in a direction perpendicular to both the second axis Y and the third axis Z.

The first specular surface 21 extends in the direction of the first axis X while maintaining the shape of the first profile.

Figure 1:
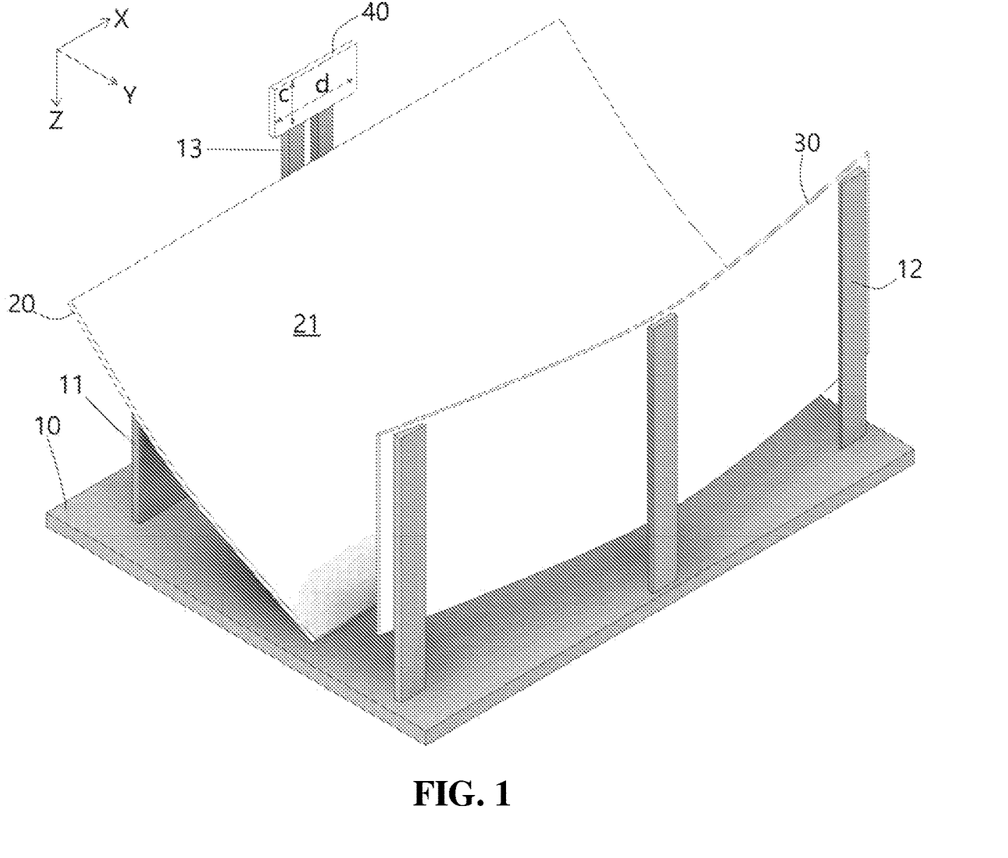
FIG. 1 is a first perspective view illustrating a light concentrating device and a solar power generator using the same according to a first preferred embodiment of the present invention.
Figure 2:
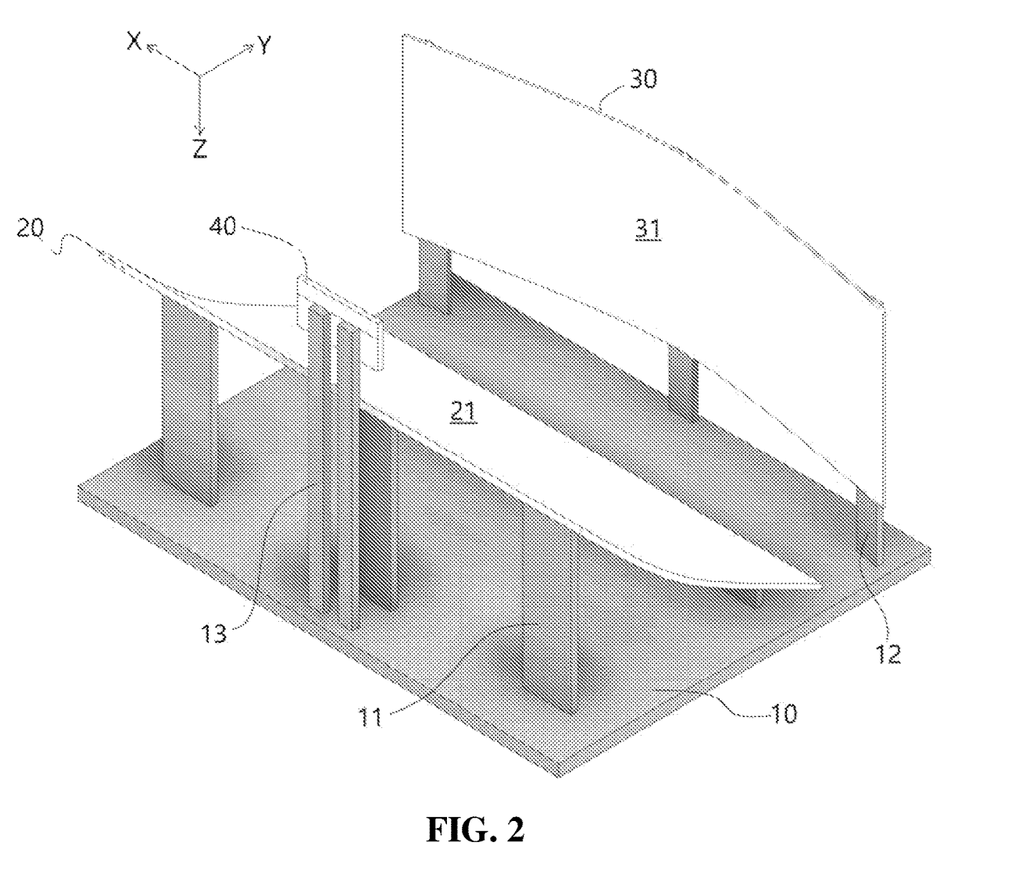
FIG. 2 is a second perspective view illustrating the light concentrating device and the solar power generator using the same according to the first preferred embodiment of the present invention.
Figure 3:
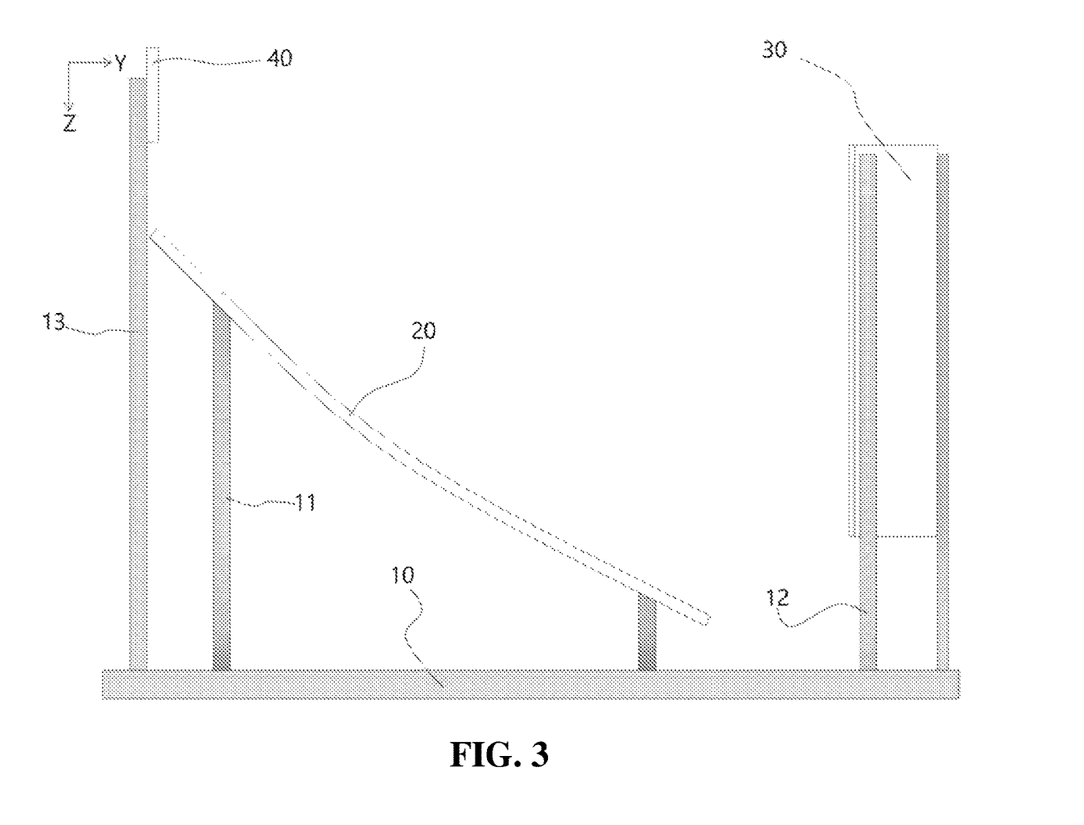
FIG. 3 is a side view illustrating the light concentrating device and the solar power generator using the same according to the first preferred embodiment of the present invention.
Figure 4:
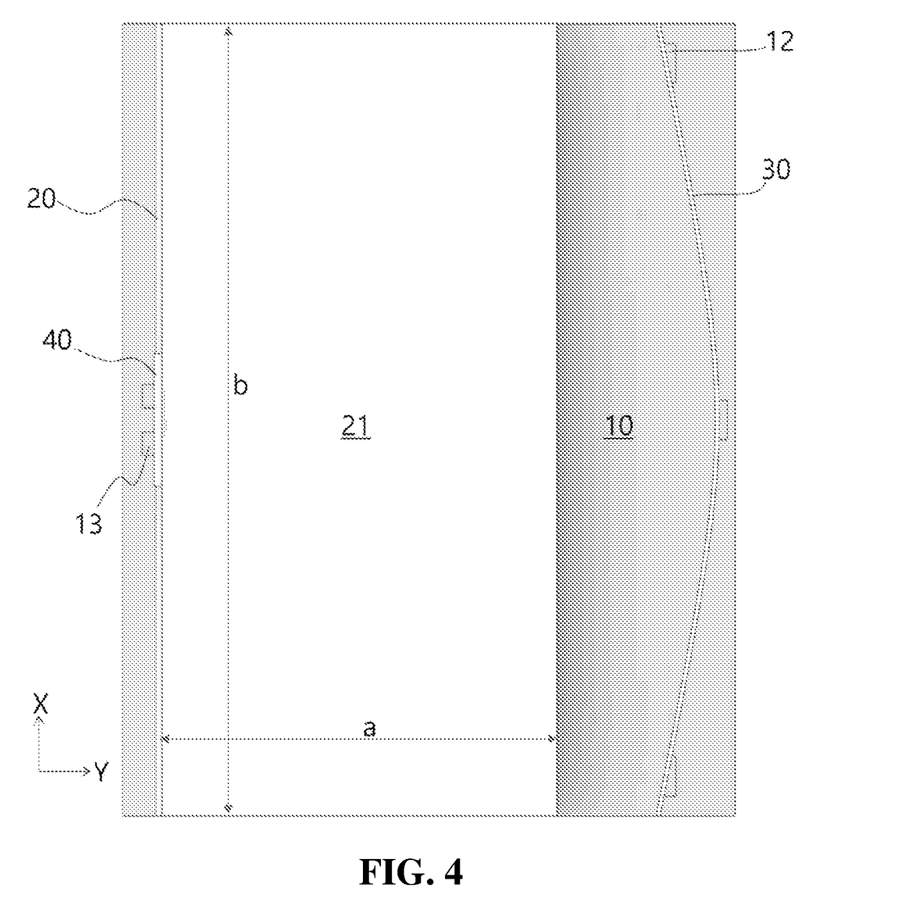
FIG. 4 is a plan view illustrating the light concentrating device and the solar power generator using the same according to the first preferred embodiment of the present invention.
Figure 5:
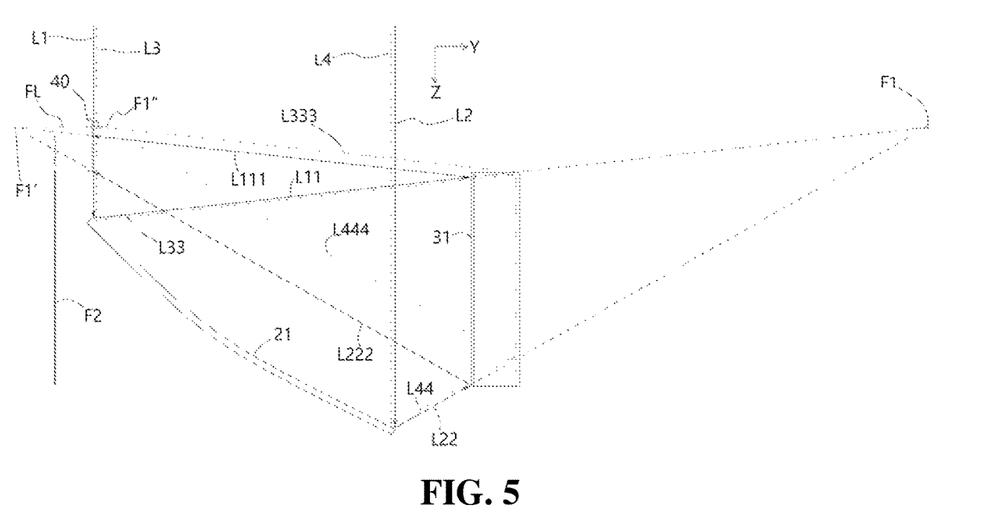
FIG. 5 is a view illustrating a light concentrating method when the light concentrating device according to the first preferred embodiment is viewed from the side.
Figure 6:
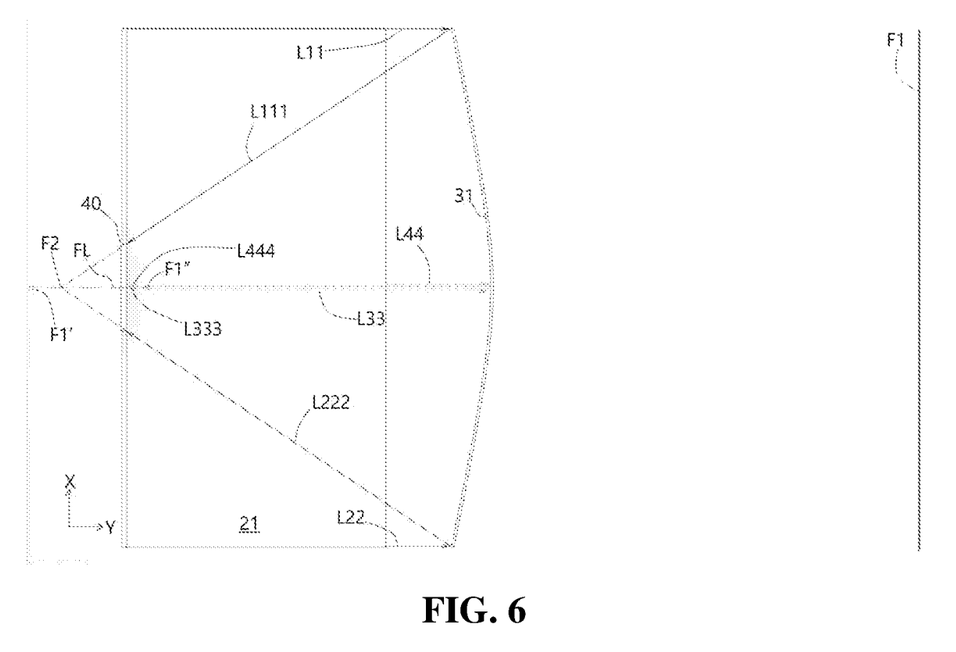
FIG. 6 is a view illustrating the light concentrating method when the light concentrating device according to the first preferred embodiment is viewed from the top.

Referring to FIGS. 5 and 6, the first specular focal point F1 has a shape extending in the direction of the first axis X.

Accordingly, in order to configure the first specular surface 21, a curved reflective film in the form of a flat sheet is attached onto the surface having the shape of the first profile along the curved surface.

Of course, in the present invention, the method of configuring the first specular surface 21 is not necessarily limited to the method of attaching the reflective film. In the present invention, the specular surface may be configured in various ways such as surface processing, thin film deposition, and the like.

The second specular surface 31 has a second profile of a concave curve, which is the cross section taken by a plane parallel to the first axis X and the second axis Y. For the purposes of the present invention, it may be understood that the parabola means the degree of concentrating and reflecting parallel light coming in one direction in the vicinity of the focal point of the parabola, rather than a precise parabola.

The shape of the second profile defines a second specular focal point F2.

Of course, the second profile is not necessarily limited to the parabolic shape. In the present invention, the first profile may have other shapes such as an elliptical arc, a circular arc, a hyperbolic arc, and the like.

The second specular surface 31 has a curved surface that the shape of the second profile extends in the direction of the third axis Z.

The shape of the second profile of the second specular surface 31 extends parallel to the third axis Z in a direction perpendicular to both the first axis X and the second axis Y.

The second specular surface 31 extends in the direction of the third axis Z while maintaining the shape of the second profile.

Referring to FIGS. 5 and 6, the second specular focal point F2 has a shape extending in the direction of the third axis Z.

Accordingly, in order to configure the second specular surface 31, a curved reflective film in the form of a flat sheet is attached onto the surface having the shape of the second profile along the curved surface.

When viewed in a direction parallel to the first axis X, the height of one end of the first specular surface 21 in the direction of the second axis Y is lower than the height of the other end. The first specular surface 21 has a concave curved surface compared to a straight line connecting the one end and the other end.

When viewed in a direction parallel to the third axis Z, the first specular surface 21 has a predetermined length a in the direction of the second axis Y, and a predetermined width b in the direction of the first axis X.

Accordingly, the incident lights L1, L2, L3, and L4 entering the first specular surface 21 in the direction parallel to the third axis Z has the length a in the direction of the second axis Y, and has the width b in the direction of the first axis X.

The first specular focal point F1 is arranged in one direction of the second axis X from the position getting out of a section that the first specular surface 21 occupies in the direction of the second axis Y. Accordingly, the first specular surface 21 generates first reflected lights L11, L22, L33, and L44 by reflecting the incident lights L1, L2, L3, and L4 in one direction of the second axis Y.

The first specular focal point F1 is arranged in the other direction of the third axis Z from the position getting out of a section that the second specular surface 31 occupies in the direction of the third axis Z, or arranged at the other end of a section that the first specular surface 21 occupies in the direction of the third axis Z. In the first preferred embodiment, a structure that the first specular focal point F1 is arranged in the other direction of the third axis Z from the position getting out of the section is illustrated. Accordingly, the first specular surface 21 reflects the incident lights L1, L2, L3, and L4 in an oblique direction to face the other direction of the third axis Z and one direction of the second axis Y to generate the first reflected lights L11, L22, L33, and L44.

The first specular surface 21 concentrates the incident lights L1, L2, L3, and L4 in such a way that the length a decreases as illustrated in FIG. 5 and the width b is constant as illustrated in FIG. 6 to generate the first reflected lights L11, L22, L33, and L44.

When viewed in the direction parallel to the third axis Z, the second specular surface 31 is symmetrical to the second axis Y. The second specular surface 31 has a concave curved surface compared to a straight line connecting both ends of the second specular surface 31 in the direction of the first axis X.

The second specular surface 31 has a size to block the entire irradiation area in which the first reflected lights L11, L22, L33, and L44 are directed toward the first specular focal point F1. Accordingly, all of the first reflected lights L11, L22, L33, and L44 become the second reflected lights L111, L222, L333, and L444 by being reflected by the second specular surface 31.

The second specular focal point F2 may be arranged in the other direction of the second axis Y in a section that the second specular surface 31 occupies in the direction of first axis X. Accordingly, the second specular surface 31 generates the second reflected lights L111, L222, L333, and L444 by reflecting the first reflected lights L11, L22, L33, and L44 in the other direction of the second axis Y.

The first specular focal point F1 is arranged in the other direction of the third axis Z from the position getting out of a section that the second specular surface 31 occupies in the direction of the third axis Z, or arranged at the other end of the section that the second specular surface 31 occupies in the direction of the third axis Z. In the first preferred embodiment, a structure that the first specular focal point F1 is arranged in the other direction of the third axis Z from the position getting out of the section is illustrated. Accordingly, the second specular surface 31 reflects the first reflected lights L11, L22, L33, and L44 in an oblique direction to face the other direction of the second axis Y and the other direction of the third axis Z to generate the second reflected lights L111, L222, L333, and L444.

The second specular surface 31 concentrates the first reflected lights L11, L22, L33, and L44 in such a way that the width b decreases as illustrated in FIG. 6 but does not additionally concentrate the length a as illustrated in FIG. 5 to generate the second reflected lights L111, L222, L333, and L444. That is, the second specular surface 31 reflects the first reflected lights L11, L22, L33, and L44 while maintaining the light concentration rate to reduce the length a.

Accordingly, the second reflected lights L111, L222, L333 are concentrated into a target area in which the width b and the length a of the incident lights L1, L2, L3, and L4 are respectively reduced.

The target area may be arranged in the other direction of the second axis Y in the section in which the second specular surface 31 occupies in the direction of the first axis X.

That is, according to the light concentrating device having the first specular surface 21 and the second specular surface 31 described above, sunlight having the predetermined width b and length a (see FIG. 4) is concentrated into the target area having a reduced width d and a reduced length c.

Therefore, in a case in which a solar panel 40 having an area (c*d) corresponding to the target area is arranged in the target area, the solar panel 40 generates solar power performing light concentration (a*b)/(c*d) times.

Referring to the drawing, the target area and the second specular surface 31 are arranged at positions out of the area through which the incident light L1, L2, L3, and L4 pass. Furthermore, the first specular surface 21 is arranged at a position getting out of an area through which the second reflected lights L111, L222, L333, and L444 pass. Accordingly, the light concentrating device of the first preferred embodiment does not cause optical attenuation since the first specular surface 21, the second specular surface 31, and the target area do not block the light path.

In addition, the concentrating device in which the light concentrating method of the present invention described above is realized, can minimize the space in which the first specular surface 21 and the second specular surface 31 respectively occupy in the direction of the first axis X and in the direction of the second axis Y, and secure the area of the incident lights L1, L2, L3, and L4 entering in the direction of the third axis Z as much as possible. Therefore, the light concentrating devices may be installed in a small area with a high degree of integration and can generate solar power more efficiently.

Meanwhile, the first specular focal point F1 may move to a first edge specular focal point F1' by reflecting the first reflected lights L11 and L22 by edge portions of both ends of the second specular surface 31 in the direction of the first axis X. Moreover, the first specular focal point F1 may move to a first central specular focal point F1" by reflecting the first reflected lights L33 and L44 by the central portion of the second specular surface 31 in the direction of the first axis X.

The first reflected lights L11, L22, L33, and L44 enter the second specular surface 31 obliquely in one direction of the second axis Y and in the other direction of the third axis Z, but the shape of the second profile of the second specular surface 31 is formed in a concave curved surface in one direction of the second axis Y. So, the first edge specular focal point F1' and the first central specular focal point F1" are inconsistent with each other.

Specifically, the first central specular focal point F1" is arranged at one side further in the direction of the second axis Y than the first edge specular focal point F1', and is arranged at the other side further in the direction of the third axis Z than the first edge specular focal point F1'.

The first specular focal point moves along a trajectory variation from the first edge specular focal point F1' to the first central specular focal point F1" as a reflection position on the second specular surface 31 moves from edges of both ends of the second specular surface 31 in the direction of the first axis X to the central portion in the direction of the first axis X. However, the illustrated drawings are only exaggerated and enlarged for the convenience of explanation, and the two focal points F1' and F1" may be located to be considerably different from the drawings, may be located to be quietly close to each other, or may be located to almost or perfectly coincide with each other.

The second specular focal point F2 may be arranged between the first edge specular focal point F1' and the first central specular focal point F1" in the direction of the second axis Y. Then, as described above, the light concentration rate may be further increased even if the light concentrating method of the present invention, in which light is concentrated while spreading somewhat to surrounding areas rather than concentrated precisely at one point, is applied.

Referring to FIGS. 1 to 4, the first specular surface 21 is realized on the surface of a first specular surface member 20, and the first specular surface member 20 is fixed at the corresponding position by a first support 11. The second specular surface 31 is realized on the surface of a second specular surface member 30, and the second specular surface member 30 is fixed at the corresponding position by a second support 12. Furthermore, the solar panel 40 is fixed at the corresponding position by a third support 13. In addition, the first support 11, the second support 12, and the third support 13 are fixed to be integrated by a base 10.

Therefore, the solar panel 40 is arranged in the target area of the light concentrating device to form a solar power generator. When the base 10 is rotated so that the third axis Z defined by the first specular surface 21, the second specular surface 31, and the solar panel 40 becomes parallel to the incident direction of sunlight, the first specular surface 21, the second specular surface 31, and the solar panel 40 rotate integrally to adjust the direction.

The shapes of the supports 11, 12, and 13 and the base 10 are merely examples, and are not limited thereto.

Figure 7:
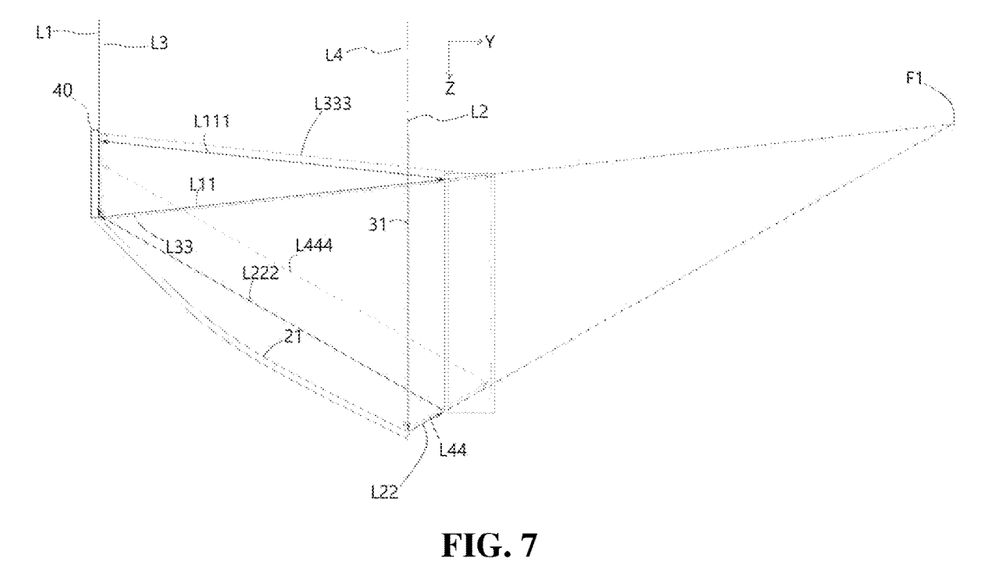
FIG. 7 is a view illustrating a light concentrating method when a light concentrating device according to a second preferred embodiment is viewed from the side.

Hereinafter, referring to FIG. 7, a light concentrating device according to a second preferred embodiment of the present invention will be described. In this instance, differences compared to the first embodiment will be mainly described.

According to the second embodiment, compared to the first embodiment, the second specular surface 31 is arranged to be closer to the first specular surface 21. In this instance, in order to have a size to block the entire irradiation area that the first reflected lights L11, L22, L33, and L44 face the first specular focal point F1, the second specular surface 31 gets longer in the direction of the third axis Z compared to the first embodiment.

Accordingly, the space occupied by the first specular surface 21 and the second specular surface 31 in the direction of the second axis Y can be further reduced. However, as the area of the first reflected lights L11, L22, L33, and L44 reflected by the second specular surface 31 increases, the target area and the area of the solar panel 40 also increase.

Compared to the first embodiment, in the second embodiment, the second specular surface 31 is arranged to be closer to the first specular surface 21, but is not arranged to be completely close to the first specular surface in the direction of the second axis Y because there is a limitation to prevent an interference between the second reflected lights L111, L222, L333, and L444 reflected from the bottom end of the second specular surface 31 and the top end of the first specular surface 21. That is, if the second specular surface 31 is arranged to be closer to the first specular surface 21 than the illustration of FIG. 7, the first specular surface 21 blocks a portion of the second reflected lights L111, L222, L333, and L444.

Figure 8:
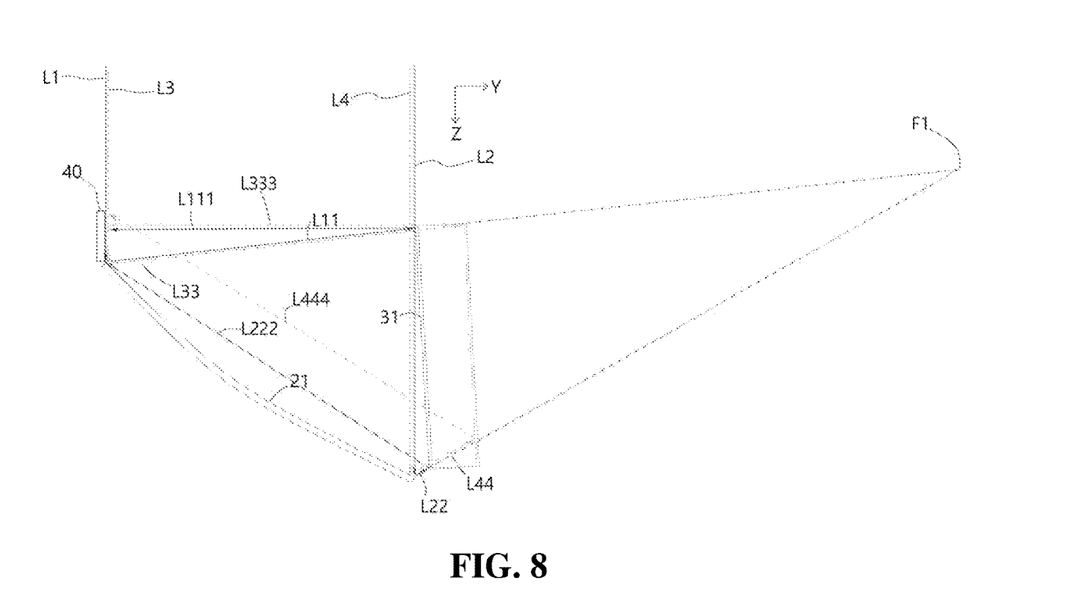
FIG. 8 is a view illustrating a light concentrating method when a light concentrating device according to a third preferred embodiment is viewed from the side.

Next, referring to FIG. 8, a light concentrating device according to a third embodiment of the present invention will be described. In this instance, differences compared to the second embodiment will be mainly described.

The third embodiment differs from the second embodiment in that the second specular surface 31 is arranged obliquely with respect to the third axis Z. That is, the shape of the second profile of the second specular surface 31 extends obliquely with respect to the second axis Y and the third axis Z in the direction perpendicular to the first axis X. According to this, compared to the second embodiment, the target area and the area of the solar panel 40 arranged in the target area may be reduced.

Figure 9:
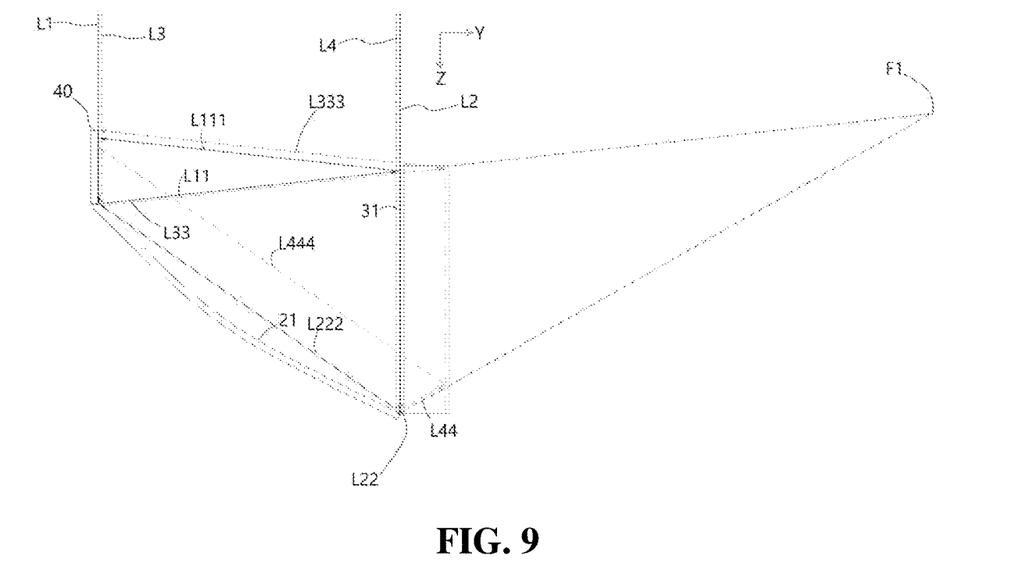
FIG. 9 is a view illustrating a light concentrating method when a light concentrating device according to a fourth preferred embodiment is viewed from the side.

Next, with reference to FIG. 9, a light concentrating device according to a fourth embodiment of the present invention will be described. In this instance, differences compared to the second embodiment will be mainly described. Compared to the second embodiment, the fourth embodiment has a structure that the second specular surface 31 is arranged to be the closest to the first specular surface 21 within a range not to block the paths of the incident lights L1, L2, L3, and L4. Compared to the second embodiment, in the fourth embodiment, because the position of the first specular focal point F1 corresponding to the first specular surface 21 is higher, even if the bottom end of the second specular surface 31 nearly meets the first specular surface 21, the first specular surface 21 does not block the second reflected lights L111, L222, L333, and L444.

As described above, when the position of the first specular focal point F1, the position of the second specular surface 31, and the posture of the second specular surface 31 are adjusted, the location and area of the target area can be adjusted.

In the drawings, the first incident light L1 is incident light entering a corner portion of one side of the top end of the first specular surface 21 in the width direction, and the second incident light L2 is incident light entering a corner portion of the other side of the bottom end of the first specular surface 32 in the width direction, the third incident light L3 is incident light entering the central portion of the top end of the first specular surface 21, and the fourth incident light L4 is incident light entering the central portion of the bottom end of the first specular surface 21.

L11 is the first reflected light of the first incident light L1, L111 is the second reflected light of the first reflected light L11 of the first incident light, L22 is the first reflected light of the second incident light L2, L222 is the second reflected light of the first reflected light L22 of the second incident light, L33 is the first reflected light of the third incident light L3, L333 is the second reflected light of the first reflected light L33 of the third incident light, L44 is the first reflected light of the fourth incident light L4, and L444 is the second reflected light of the first reflected light L44 of the fourth incident light.

Figure 10:
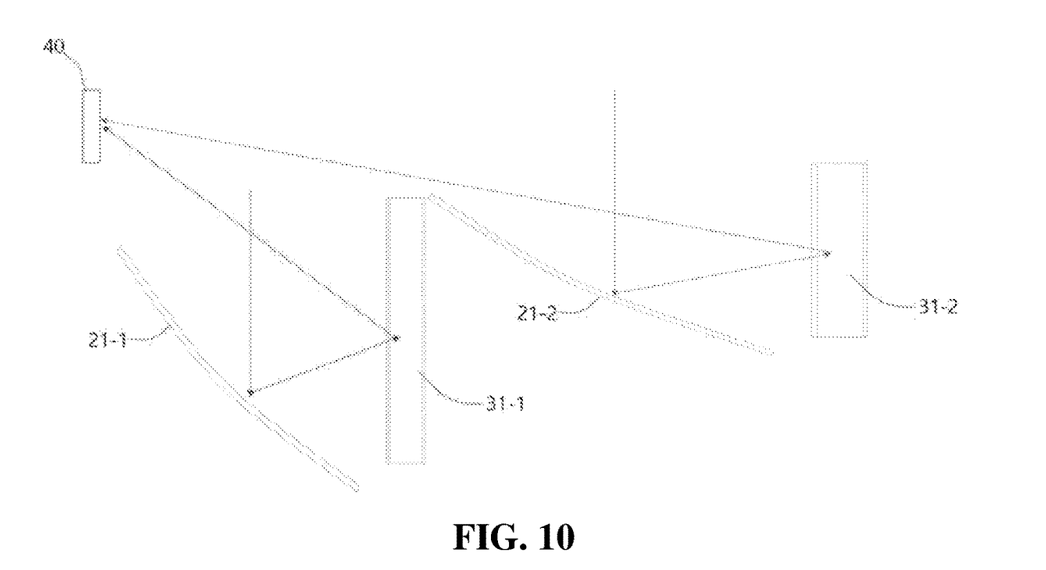
FIG. 10 is a view illustrating a light concentrating method when a light concentrating device according to a fifth preferred embodiment is viewed from the side.

The above-described embodiments propose that a pair of the first and second specular surfaces concentrate light into the target area. However, it is also possible that two or more pairs of the first and second specular surfaces having different parabolic focal points may concentrate light into one target area (see FIG. 10).

As described above, the present invention has been described with reference to the drawings illustrated, but the present invention is not limited by the embodiments and drawings disclosed herein. It is obvious that various modifications can be made by those skilled in the art within the scope of the technical idea of the present invention. It should be understood that the present invention include effects predictable by the corresponding configuration even if actions and effects according to the configuration of the present invention are not explicitly described.

What is claimed is:

1. A light concentrating device arranged in a space defined by a first axis (X) and a second axis (Y) orthogonal to each other, and a third axis (Z) perpendicular to the first axis (X) and the second axis (Y), comprising:
    a first specular surface having a first profile of a concave curve, which is a cross section taken by a plane parallel to the second axis (Y) and the third axis (Z), wherein the first profile extends in parallel to the first axis (X); and
    a second specular surface having a second profile of a concave curve, which is a cross section taken by a plane parallel to the first axis (X) and the second axis (Y), wherein the second profile extends in parallel to the third axis (Z),
    wherein the first specular surface has a predetermined length parallel to the second axis (Y) and a predetermined width parallel to the first axis (X) when viewed in parallel to the third axis (Z), and the first specular surface is configured to receive incident lights entering in a first direction (+Z direction) and to reflect the incident lights along a diagonal direction defined by a second direction (−Z direction) opposite to the first direction (+Z direction) and a third direction (+Y direction) parallel to the second axis (Y) so as to generate first reflected lights,
    wherein the second specular surface is configured to reflect the first reflected lights in a diagonal direction defined by a fourth direction (−Y direction) opposite to the third direction (+Y direction) and the second direction (−Z direction) so as to generate second reflected lights,
    wherein the second reflected lights are concentrated into a target area of which a width and a length are respectively less than the predetermined width and the predetermined length,
    wherein a solar panel is arranged in the target area, extends in parallel to the third axis (Z), and is disposed above the first specular surface member in the second direction (−Z direction),
    wherein an upper end of the solar panel is disposed above the second specular surface member in the second direction (−Z direction),
    wherein the solar panel generates solar power performing light concentration of (A*B)/(C*D) times, and
    wherein A denotes the predetermined length of the first specular surface parallel to the second direction (Y), B denotes the predetermined width of the first specular surface parallel to the first axis (X), C denotes a length of the solar panel, and D denotes a width of the solar panel.

2. The light concentrating device according to claim 1, wherein the shape of the first profile of the first specular surface extends parallel to the first axis (X) in perpendicular to the second axis (Y) and the third axis (Z).

3. The light concentrating device according to claim 1, wherein the shape of the second profile of the second specular surface extends parallel to the third axis (Z) in perpendicular to the first axis (X) and the second axis (Y).

4. The light concentrating device according to claim 1, wherein the shape of the second profile of the second specular surface extends obliquely with respect to the second axis (Y) and the third axis (Z) in perpendicular to the first axis (X).

5. The light concentrating device according to claim 1, wherein the first profile and the second profile are disposed in a parabolic shape.

6. The light concentrating device according to claim 5, wherein a first specular focal point defined by the shape of the first profile is arranged in the second direction (−Z direction) from a position outside a section that the first specular surface occupies in parallel to the third axis (Z), and is arranged in the third direction (+Y direction) from a position outside a section that the first specular surface occupies in parallel to the second axis (Y).

7. The light concentrating device according to claim 6, wherein the first specular focal point is arranged in the second direction (−Z direction) from a position outside a section that the second specular surface occupies in parallel to the third axis (Z), and is arranged in the third direction (+Y direction) from a position outside a section that the second specular surface occupies in parallel to the second axis (Y).

8. The light concentrating device according to claim 5, wherein a second specular focal point defined by the shape of the second profile is arranged in the fourth direction (−Y direction) in a section that the second specular surface occupies in parallel to the first axis (X).

9. The light concentrating device according to claim 1, wherein a first specular focal point defined by the shape of the first profile moves to a first edge specular focal point by reflecting some of the first reflected lights by edge portions of both ends of the second specular surface in parallel to the first axis (X),
wherein the first specular focal point moves to a first central specular focal point by reflecting the rest of the first reflected lights by the central portion of the second specular surface in parallel to the first axis (X), and
wherein the first edge specular focal point is arranged at a position coinciding with the first central specular focal point in parallel to the second axis (Y), or arranged at one side further in the fourth direction (−Y direction) than the first central specular focal point.

10. The light concentrating device according to claim 9, wherein a second specular focal point defined by the shape of the second profile is arranged at a position coinciding with the first edge specular focal point in parallel to the second axis (Y) or arranged at one side further in parallel to the second axis (Y) than the first edge specular focal point, and is arranged at a position coinciding with the first central specular focal point in parallel to the second axis (Y) or is arranged at the one side further in the fourth direction (−Y direction) than the first central specular focal point.

11. The light concentrating device according to claim 9, wherein the first edge specular focal point is arranged at a position coinciding with the first central specular focal point in parallel to the third axis (Z), or arranged at another side further in the first direction (+Z direction) of the third axis than the first central specular focal point.

12. The light concentrating device according to claim 1, wherein the first specular surface, the second specular surface, and the solar panel are rotatable while being integrated with each other.

* * * * *